US012627683B2

(12) United States Patent
Kumar et al.

(10) Patent No.: US 12,627,683 B2
(45) Date of Patent: May 12, 2026

(54) RISK MANAGEMENT SIMULATOR FOR MULTI-CLOUD DATA COMPONENTS

(71) Applicant: Dell Products L.P., Round Rock, TX (US)

(72) Inventors: Avinash Kumar, Kankar Bagh Patna (IN); Mahesh Reddy Appireddygari Venkataramana, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 93 days.

(21) Appl. No.: 18/678,593

(22) Filed: May 30, 2024

(65) Prior Publication Data

US 2025/0373624 A1     Dec. 4, 2025

(51) Int. Cl.
*H04L 9/40* (2022.01)
*H04L 41/16* (2022.01)

(52) U.S. Cl.
CPC .......... *H04L 63/1416* (2013.01); *H04L 41/16* (2013.01); *H04L 63/1425* (2013.01)

(58) Field of Classification Search
CPC .. H04L 63/1416; H04L 41/16; H04L 63/1425
See application file for complete search history.

(56) References Cited

U.S. PATENT DOCUMENTS

| | | | |
|---|---|---|---|
| 2018/0159887 A1* | 6/2018 | DiGiambattista | G06F 21/577 |
| 2019/0364057 A1* | 11/2019 | Hazay | H04W 24/08 |
| 2020/0186563 A1* | 6/2020 | Convertino | G06N 20/00 |
| 2020/0285737 A1* | 9/2020 | Kraus | G06F 21/552 |
| 2020/0380123 A1* | 12/2020 | Reimann | G06F 21/56 |
| 2022/0060453 A1* | 2/2022 | Crabtree | H04L 63/08 |
| 2022/0060491 A1* | 2/2022 | Achleitner | H04L 63/1425 |
| 2023/0005360 A1* | 1/2023 | Zhou | G06N 20/20 |
| 2025/0299017 A1* | 9/2025 | Song | G06N 3/042 |

* cited by examiner

*Primary Examiner* — Dhairya A Patel
*Assistant Examiner* — Eui H Kim
(74) *Attorney, Agent, or Firm* — Chamberlain, Hrdlicka, White, Williams & Aughtry; Aly Z. Dossa

(57) ABSTRACT

Techniques described herein relate to a method for performing threat simulations. The method includes preparing a multi-cloud infrastructure (MCI) for live data collection, wherein: the MCI includes components, a first component of the components is associated with a first cloud service provider, and a second component of the components is associated with a second cloud service provider; obtaining, after the preparing, live data from the MCI; generating a prediction using the live data and a prediction model, wherein the prediction specifies whether the live data indicates that there is a threat within the MCI; making a first determination that the prediction indicates a threat associated with the MCI has been identified; and in response to the first determination: performing threat remediation using the prediction and a diagnostic repository.

16 Claims, 6 Drawing Sheets

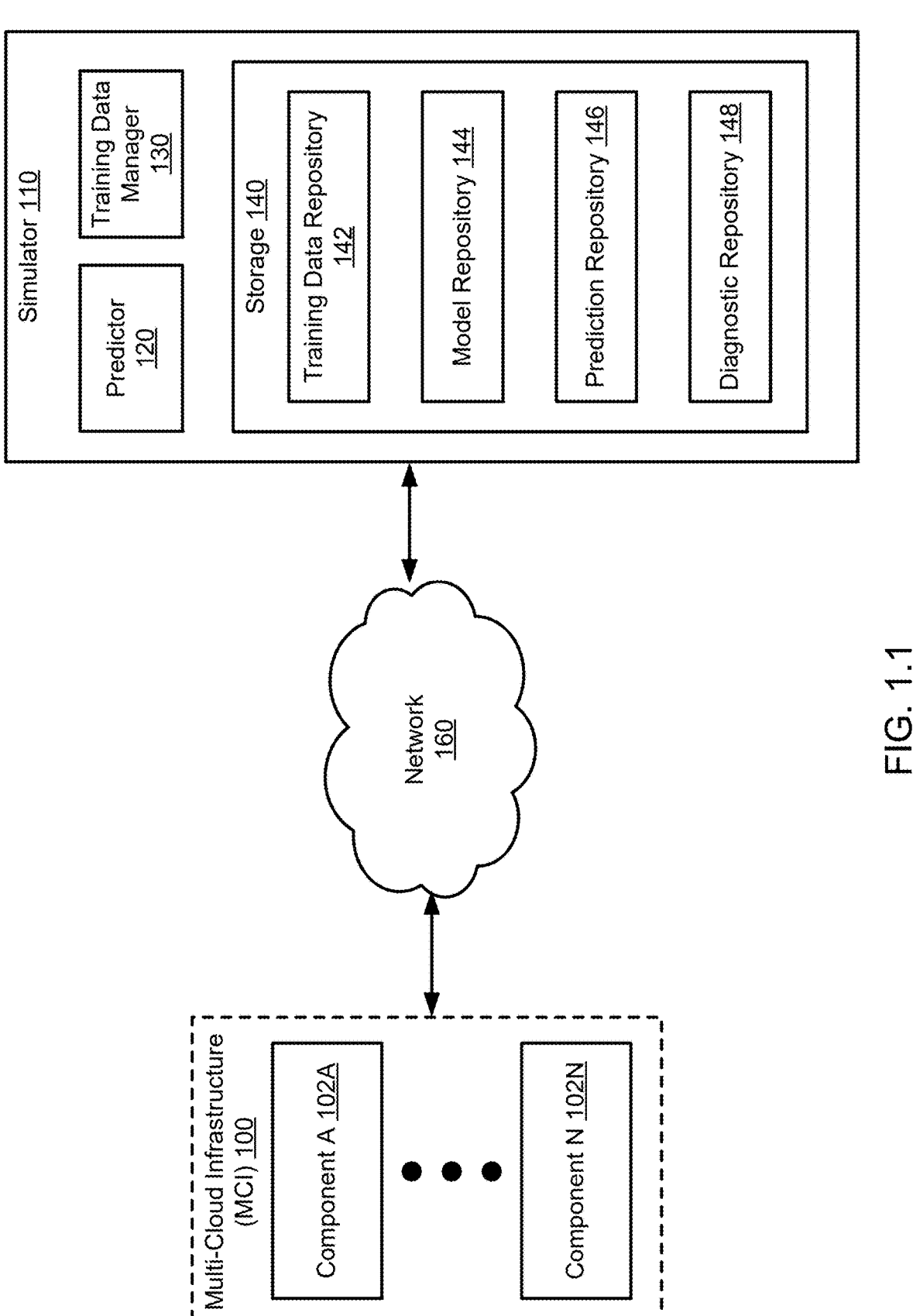
FIG. 1.1

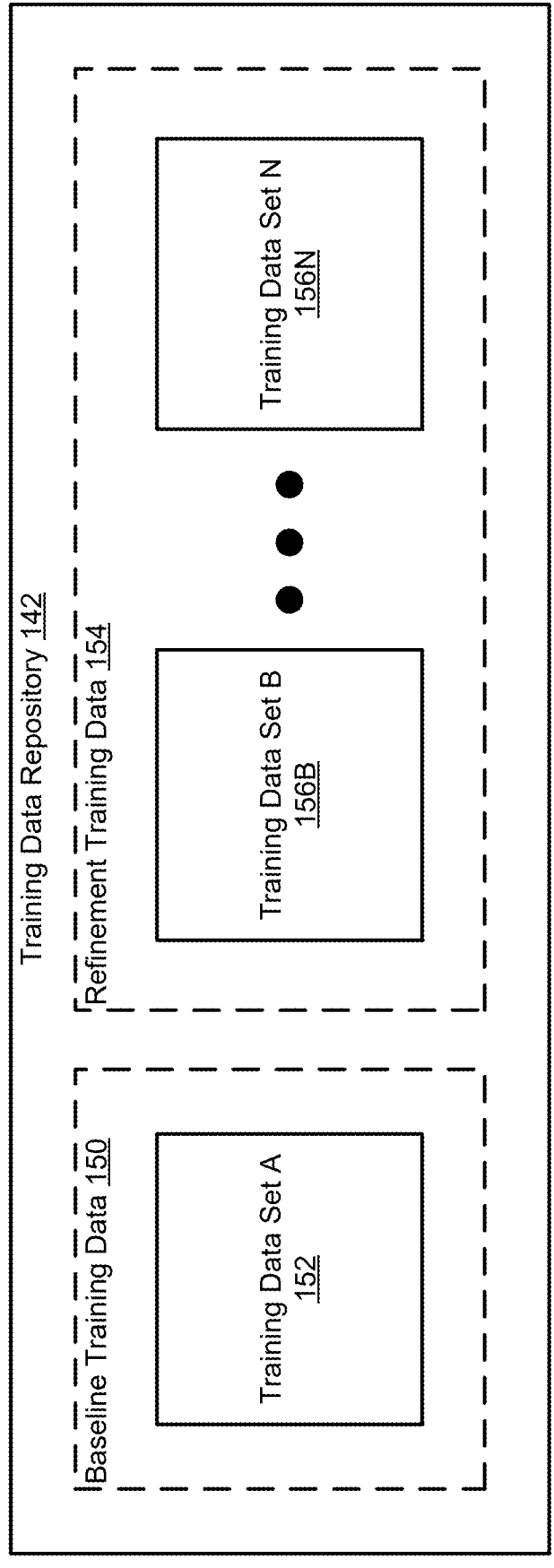
FIG. 1.2

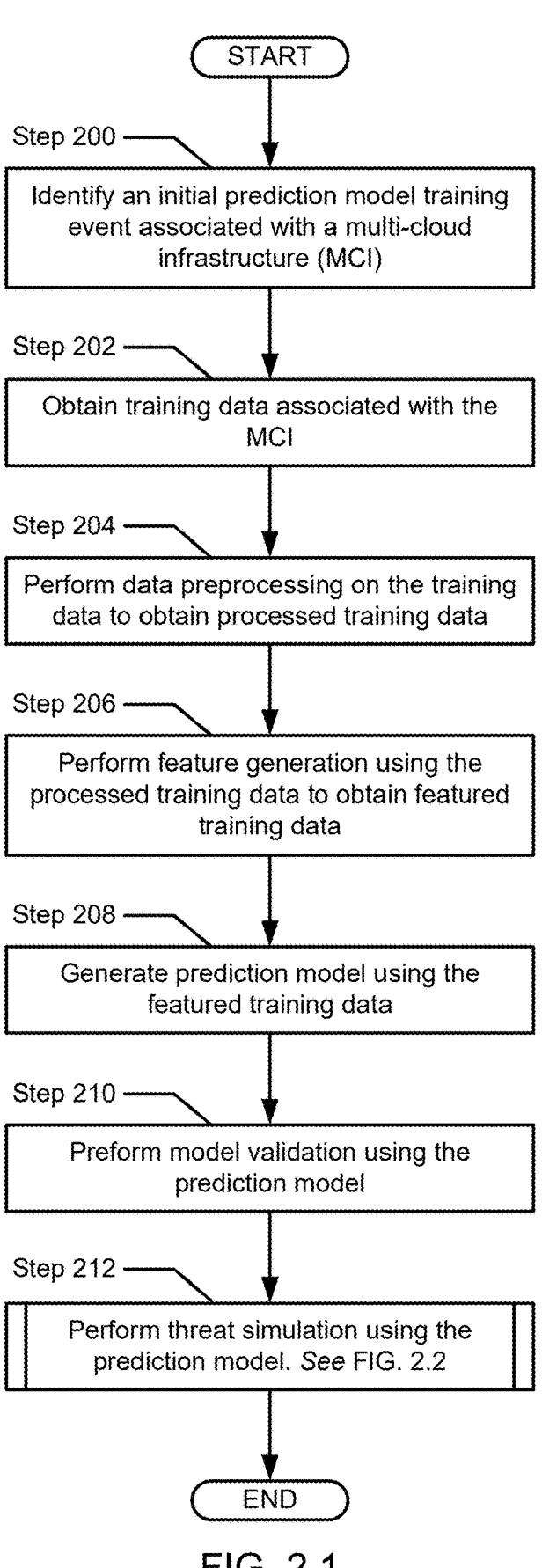

START

Step 200

Identify an initial prediction model training event associated with a multi-cloud infrastructure (MCI)

Step 202

Obtain training data associated with the MCI

Step 204

Perform data preprocessing on the training data to obtain processed training data Step 206

Perform feature generation using the processed training data to obtain featured training data Step 208

Generate prediction model using the featured training data

Step 210

Preform model validation using the prediction model

Step 212

Perform threat simulation using the prediction model. *See* FIG. 2.2

END

FIG. 2.1

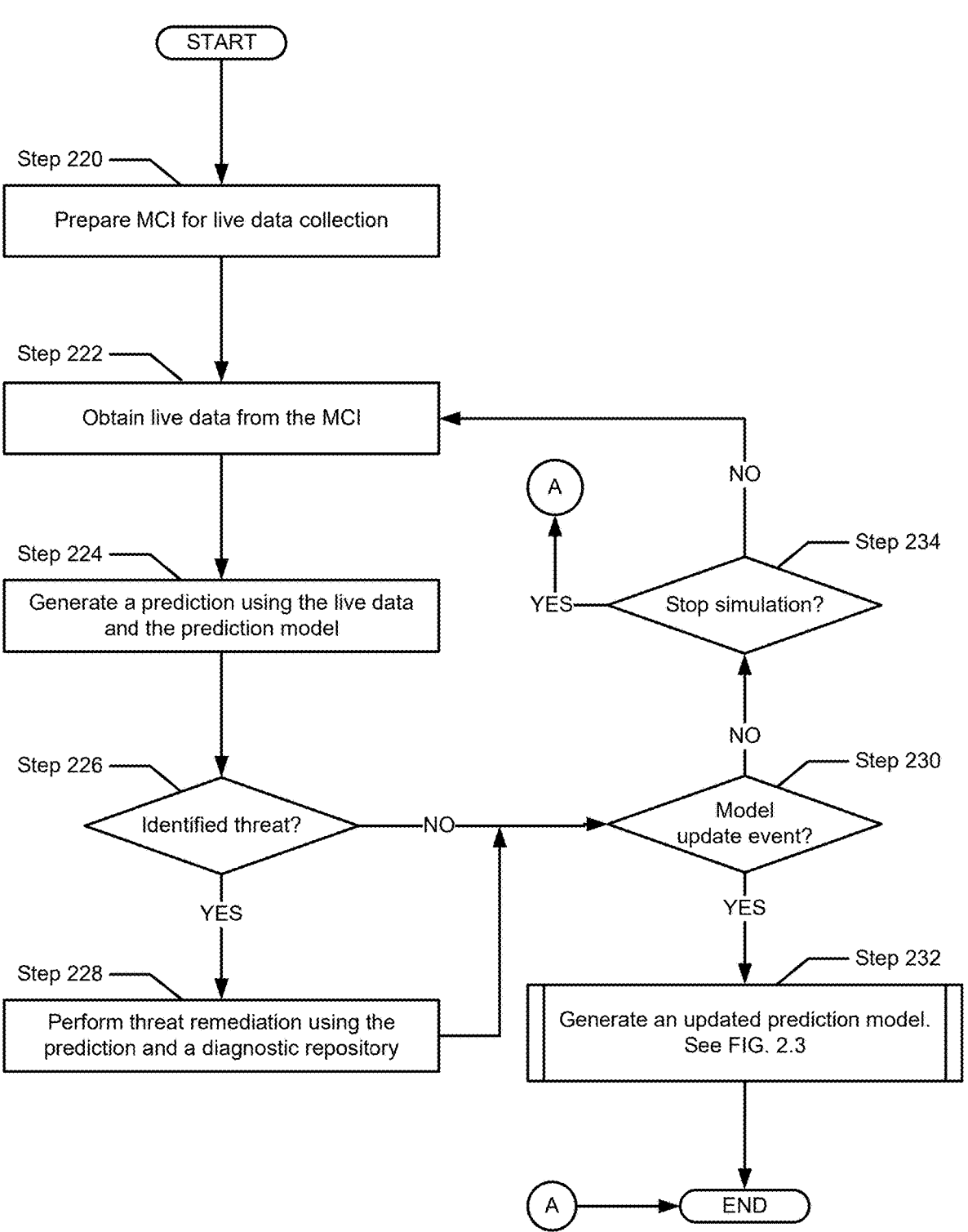
FIG. 2.2

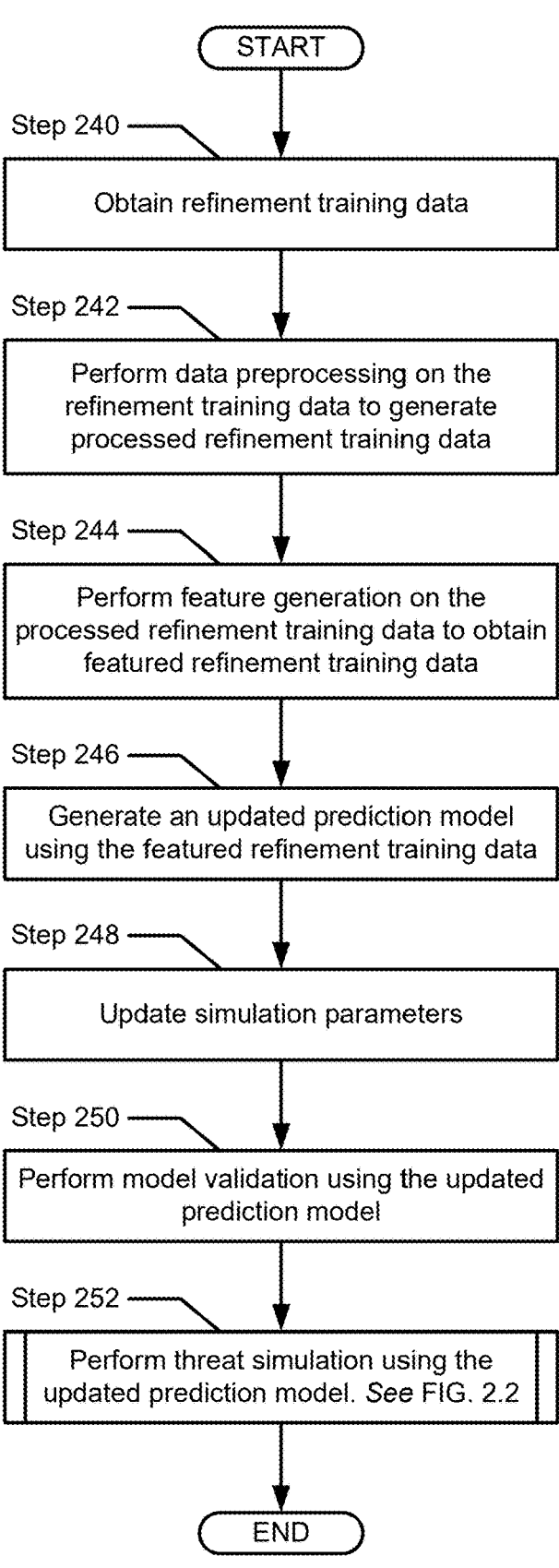
FIG. 2.3

300

RISK MANAGEMENT SIMULATOR FOR MULTI-CLOUD DATA COMPONENTS

BACKGROUND

Computing devices may provide services for users. To provide the services, the computing devices may obtain other services from other computing devices included in a computing environment. The computing devices in the computing environment may be susceptible to threats from nefarious users. To protect the computing devices and data in the computing environment, the threats may be searched for and identified. Identified threats may be remediated to mitigate damages associated with the identified threats.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments disclosed herein.

FIG. 1.2 shows a diagram of a training data repository in accordance with one or more embodiments disclosed herein.

FIG. 2.1 shows a flowchart of a method for training an initial prediction model in accordance with one or more embodiments disclosed herein.

FIG. 2.2 shows a flowchart of a method for performing risk simulation in accordance with one or more embodiments disclosed herein.

FIG. 2.3 shows a flowchart of a method for updating a predication model in accordance with one or more embodiments disclosed herein.

DETAILED DESCRIPTION

Figure 3:
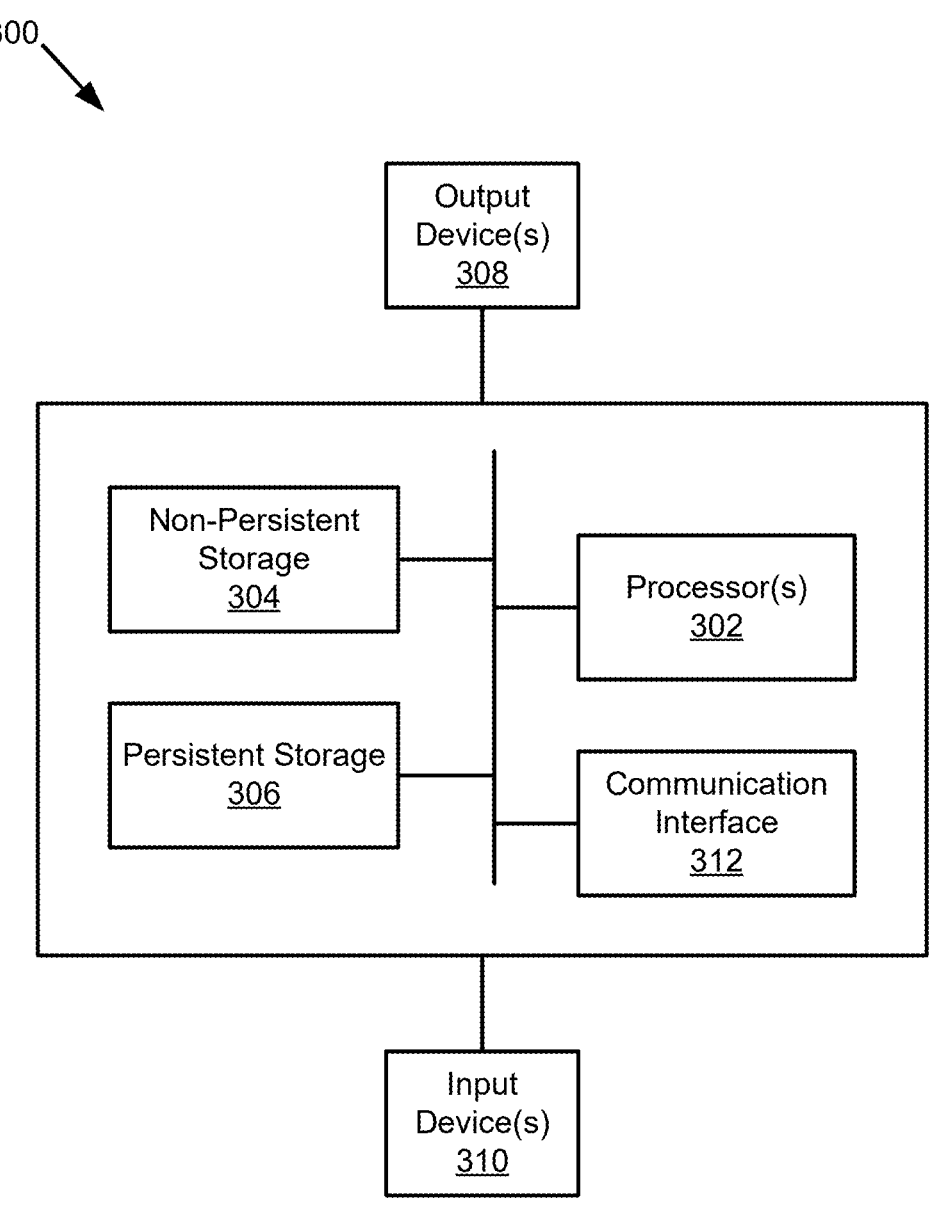
FIG. 3 shows a diagram of a computing device in accordance with one or more embodiments disclosed herein.

Specific embodiments will now be described with reference to the accompanying figures. In the following description, numerous details are set forth as examples of the embodiments disclosed herein. It will be understood by those skilled in the art that one or more embodiments disclosed herein may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to methods, systems, and/or non-transitory computer readable mediums for performing risk simulations for a multi-cloud infrastructure (MCI).

In the realm of modern technology, large-scale infrastructures may stand as crucial pillars of operations for businesses and organizations across industries. However, this digital evolution has also brought forth an alarming escalation in cyber threats, especially when managing multi-cloud-based data components. The looming danger of sophisticated cyberattacks may pose a substantial risk to these infrastructures, potentially resulting in severe breaches, data loss, and operational disruptions. Conventional cybersecurity measures, often reliant on reactive strategies like signature-based detection, fall short in the face of these evolving threats. There is an evident need for a proactive solution that can accurately anticipate, simulate, and counteract potential cyber threats in real-time, specifically tailored to the challenges of multi-cloud-based data components. This solution must integrate seamlessly with existing cybersecurity frameworks while harnessing the power of advanced technologies like machine learning to provide a comprehensive and adaptive defense mechanism.

The current market lacks a proactive simulation solution for efficient risk mitigation. This gap hampers decision-making and often results in increased downtime. Traditional risk management is reactive, failing to anticipate and simulate real-time risks. Accordingly, there is a need for an intelligent, adaptive simulation solution that integrates with existing frameworks and employs advanced technologies like machine learning. Such a solution would empower organizations to proactively mitigate risks, reducing downtime and enhancing decision-making.

Some traditional approaches may include reactive risk management. This traditional approach may involve identifying and addressing risks after they have already occurred. Reactive risk management may rely on historical data and past incidents to formulate risk mitigation strategies. The primary drawback is the inability to proactively anticipate and simulate risks in real-time, leaving organizations vulnerable to unforeseen threats.

Other traditional approaches may include rule-based risk assessment. Some organizations use rule-based systems to assess risks based on predefined criteria. While this approach is more structured than purely reactive methods, it still lacks the adaptability and real-time capabilities needed to effectively handle the dynamic and evolving nature of modern risks.

To address, at least in part, the problems discussed above, embodiments disclosed herein relate to methods, systems, and/or non-transitory computer readable mediums to introduce a paradigm shift in cybersecurity for multi-cloud-based data components by addressing the pressing need for a proactive defense strategy. Leveraging the efficiency and versatility of the k-nearest neighbors (KNN) algorithm, embodiments disclosed herein aim to revolutionize how large-scale infrastructures, particularly those reliant on multi-cloud data components, guard against cyber threats.

By integrating the KNN algorithm, the embodiments disclosed herein gain the ability to analyze and correlate vast amounts of real-time data from various sources, such as network traffic, user behaviors, and system activities within the multi-cloud environment. This dynamic data fusion forms the foundation for threat profiling, where the KNN algorithm identifies patterns and anomalies associated with known threats specific to multi-cloud configurations.

Crucially, the embodiments disclosed herein go beyond mere pattern recognition. Embodiments disclosed herein employ the KNN algorithm to simulate potential threat scenarios based on the identified patterns, offering security teams valuable insights into how specific attacks might manifest in the context of multi-cloud-based data components. This predictive capability empowers organizations to take proactive measures to counteract threats before they can exploit vulnerabilities within the multi-cloud environment.

The system's real-time nature ensures that it remains vigilant against emerging threats within the multi-cloud landscape. It continuously refines its KNN model through adaptive learning, incorporating new threat vectors and attack techniques as they arise within multi-cloud environments. This adaptability equips the solution to stay ahead of cybercriminals and safeguard against future threats specific to multi-cloud data components.

The embodiments disclosed herein provide disruptive innovation that lies in its fusion of the KNN algorithm's simplicity with real-time threat simulation and prediction, customized for multi-cloud environments. While machine learning has been applied in cybersecurity, embodiments disclosed herein stand out by actively simulating threats in real-time within the multi-cloud context, enabling rapid decision-making.

With regards to prior solutions, conventional cybersecurity tools predominantly rely on signature-based detection and rule-based systems, often ill-suited for the complexity of multi-cloud-based data components. While machine learning models are gaining ground, they often focus on post-incident analysis. Embodiments disclosed herein diverge from these prior solutions by offering a predictive and adaptable approach, enhancing the resilience of large-scale infrastructures, particularly those relying on multi-cloud data components, against cyber threats within these intricate ecosystems.

In essence, a proactive cyber threat simulator utilizing the KNN algorithm redefines the cybersecurity landscape for multi-cloud-based data components. With its real-time threat simulation, adaptability, and machine learning prowess, embodiments disclosed herein act as a pioneer in safeguarding large-scale infrastructures that rely on multi-cloud data components against the ever-evolving cyber threat landscape.

FIG. 1.1 shows a diagram of a system in accordance with one or more embodiments disclosed herein. The system may include a multi-cloud infrastructure (MCI) (100), a simulator (110), and a network (160). The components of the system illustrated in FIG. 1.1 may be operatively connected to each other and/or operatively connected to other entities (not shown) via any combination of wired (e.g., Ethernet) and/or wireless networks (e.g., local area network, wide area network, Internet, etc.) without departing from embodiments disclosed herein. Each component of the system illustrated in FIG. 1.1 is discussed below.

In one or more embodiments, the MCI (100) may include the functionality to provide cloud computing services for users of the system and/or other entities (e.g., clients) not shown in FIG. 1.1. The cloud computing services may include any computer implemented services provided by cloud infrastructure without departing from embodiments disclosed herein. The cloud computing services may include, for example, storing large quantities of data, implementing data storage tiers, processing data, transmitting data, implementing databases, training machine learning models, inferencing, executing applications and/or services, managing applications and/or services. The cloud computing services may include other and/or additional cloud computing services without departing from embodiments disclosed herein.

To perform the aforementioned cloud computing services, the MCI (100) may include any quantity of components such as component A (102A) and component N (102N) without departing from embodiments disclosed herein. Each component (e.g., 102A, 102N) may perform any portion of the cloud computing services provided by the MCI (100) without departing from embodiments disclosed herein. For example, component A (102A) may implement a database and component N (102N) may execute applications. The components (e.g., 102A, 102N) may perform similar or different portions of the cloud computing services. Each component (e.g., 102A, 102N) may be associated with a particular cloud service provider. Each component (e.g., 102A, 102N) may be associated with the same or different cloud service providers. For example, a first component may be associated with a first cloud service provider and a second component may be associated with a second cloud service provider. Each component associated with a particular cloud service provider may include functionalities, protocols, application programming interfaces (APIs), etc. native to the cloud service provider. To perform the aforementioned portions of the cloud computing services, the components (e.g., 102A, 102N) may send or obtain data/information to or from other components (e.g., 102A, 102N) in the MCI (100). For example, a first component executing applications may send data generated by an application to a second component implementing a database to store the data in the database.

Additionally, the components (e.g., 102A, 102N) may include the functionality to performing monitoring to generate live data that may be used to perform risk simulations for the MCI (100) and/or to generate training data that may be used to generate prediction models. Alternatively, the components (e.g., 102A, 102N) may be operatively connected to monitoring entities (e.g., monitoring services executing on computing devices operatively connected to the components (e.g., 102A, 102N)) (not shown) that may generate live data as discussed above. The components (e.g., 102A, 102N) may generate, share, or otherwise provide information to the monitoring components that may be used to generate live data. The components (e.g., 102A, 102N) may include other and/or additional functionalities without departing from embodiments disclosed herein.

In one or more embodiments, the components (e.g., 102A, 102N) of the MCI (100) may be implemented using one or more computing devices. In one or more embodiments, a computing device may be any device, portion of a device, or any set of devices capable of electronically processing instructions and may include any number of components, which include, but are not limited to, any of the following: one or more processors (e.g. components that include integrated circuitry) (not shown), memory (e.g., random access memory (RAM)) (not shown), input and output device(s)

(not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), accelerators (e.g., GPUs) (not shown), sensors (not shown) for obtaining data, and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a hyper-converged infrastructure, a cluster, a virtual machine, a logical container (e.g., for one or more applications), a cloud resource, and/or any other type of device with the aforementioned requirements.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium. For additional information regarding computing devices, refer to FIG. 3.

The components (e.g., 102A, 102N) may be implemented using logical devices without departing from the embodiments disclosed herein. For example, the components (e.g., 102A, 102N) may include virtual machines that utilize computing resources of any number of physical computing devices to provide the functionality of the components (e.g., 102A, 102N). The components (e.g., 102A, 102N) may be implemented using other types of logical devices without departing from the embodiments disclosed herein.

In one or more embodiments, the simulator (110) may include the functionality to perform risk simulation services to identify threats in the MCI (100). The risk simulation services may include: (i) generating initial prediction models using training data associated with the MCI (100), (ii) performing risk simulations using live data to generate threat predictions for the MCI (100), and (iii) generating updated prediction models using refinement training data. The risk simulation services may include other and/or additional services without departing from embodiments disclosed herein. The simulator (110) may include other and/or additional functionalities without departing from embodiments disclosed herein. The simulator (110) may include the functionality to perform all, or a portion of, the methods of FIGS. 2.1-2.3. For additional information regarding the functionality of the simulator, refer to FIGS. 2.1-2.3.

In one or more embodiments, the simulator (110) may be implemented as one or more computing devices. The computing device may be an embodiment of the computing devices discussed above.

In one or more embodiments, the simulator (110) using logical devices without departing from the embodiments disclosed herein. For example, the simulator (110) may include virtual machines that utilize computing resources of any number of physical computing devices to provide the functionality of the simulator (110). The simulator (110) may be implemented using other types of logical devices without departing from the embodiments disclosed herein.

As discussed above, the simulator (110) may perform risk simulation services. In one or more embodiments, to perform the aforementioned services, the simulator (110) may include a predictor (120), training data manager (130), and storage (140). The simulator (110) may include additional, fewer, and/or other components without departing from embodiments disclosed herein. Each of the aforementioned components of the simulator (110) is discussed below.

In one or more embodiments, the predictor (120) may be configured to include the functionality to perform prediction model generation services and prediction generation services of the risk simulation services. The prediction model generation services may include generating initial prediction models using training data and generating updated prediction models using refinement training data. The prediction generation services may include generating threat predictions using live data and prediction models. The predictor (120) may include other and/or additional functionalities without departing from embodiments disclosed herein. For additional information regarding the functionality of the predictor (120), refer to FIGS. 2.1-2.3.

In one or more embodiments, the predictor (120) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the predictor (120) described throughout this Detailed Description.

In one or more embodiments disclosed herein, the predictor (120) may be implemented as computer instructions, e.g., computer code, stored on a storage (e.g., 140) that when executed by a processor of the simulator (110) causes the simulator (110) to provide the functionality of the predictor (120) described throughout this Detailed Description.

In one or more embodiments, the training data manager (130) may be configured to include the functionality to provide training data management services. The training data management services may include: (i) obtaining training data and/or refinement training data from components (e.g., 102A, 102N), users (e.g., clients used by users, not shown), and/or other entities not shown in the system of FIG. 1.1, (ii) processing training data and/or refinement training data, (iii) performing feature generation on the training data and refinement training data, (iv) obtaining live data, (v) processing live data, (vi) performing feature generation on the live data, and (vii) providing training data, refinement training data, and live data to the predictor for prediction model generation and risk simulation. The training data management services may include other and/or additional services without departing from embodiments disclosed herein. The training data manager (130) may include other and/or additional functionalities without departing from embodiments disclosed herein. For additional information regarding the functionality of the training data manager (130), refer to FIGS. 2.1-2.3.

In one or more embodiments, the training data manager (130) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the training data manager (130) described throughout this Detailed Description.

In one or more embodiments disclosed herein, the training data manager (130) may be implemented as computer instructions, e.g., computer code, stored on a storage (e.g., 140) that when executed by a processor of the simulator (110) causes the simulator (110) to provide the functionality of the training data manager (130) described throughout this Detailed Description.

In one or more embodiments, the storage (140) may be implemented using one or more volatile or non-volatile storages or any combination thereof. The storage (140) may include the functionality to, or otherwise be configured to, store and provide all, or portions, of information that may be used by the simulator (110), predictor (120), and/or the training data manager (130). The information stored in the storage (140) may include a training data repository (142), a model repository (144), a prediction repository (146), and a diagnostic repository (148). The storage (140) may include other and/or additional information without departing from embodiments disclosed herein. Each of the aforementioned types of information is discussed below.

In one or more embodiments, the training data repository (142) may include one or more data structures that include data generated by, and/or associated with, the components (e.g., 102A, 102N) of the MCI (100). The training data repository (142) may include any quantity of data. The data may include information regarding the components (e.g., 102A, 102N) of the MCI (100). The data may include features that may be used to generate prediction models and threat predictions during risk simulation. The training data repository (142) may include other and/or additional information without departing from embodiments disclosed herein. For additional information regarding the training data repository (142), refer to FIG. 1.3.

In one or more embodiments, the model repository (144) may include one or more data structures that include prediction models that may be used to perform risk simulation for the MCI (100) and generate threat predictions associated with the MCI (100). The prediction models may be, for example, a machine learning classification models generated using a machine learning algorithm. The machine learning models may be K-Nearest Neighbors (KNN) models generated using KNN algorithms. The prediction models may generate classifications of threats or non-threats based on inputs (e.g., a set of training data or live data) by identifying the distance or proximity between the inputs and other data sets. The prediction models may include an initial prediction model and updated prediction models. The initial prediction model may be generated using the machine learning algorithm and an initial set of training data. The updated prediction models may include any quantity of prediction models that were generated using sets of refinement training data, a previous prediction model and the machine learning algorithm. The updated prediction models may include a higher model accuracy compared to previously generated prediction models. The model repository (144) may include other and/or additional information without departing from embodiments disclosed herein.

In one or more embodiments, the prediction repository (146) may include one or more data structures that includes one or more predictions generated by the prediction models. The prediction repository (146) may store any quantity of generated predictions without departing from embodiments disclosed herein. The stored predictions may specify whether a set of inputs (e.g., live data) obtained during risk simulation is classified as a threat or not classified as a threat. The stored predictions may be associated with a timestamp specifying the point in time in which the prediction was generated and a prediction model identifier to specify the prediction model used to generate the prediction. The stored predictions may also be associated with the corresponding inputs (e.g., sets of live data) used to generate the stored predictions. The prediction repository (146) may include other and/or additional information without departing from embodiments disclosed herein.

In one or more embodiments, the diagnostic repository (148) may include one or more data structures that include actions that the simulator (110) may perform or may initiate to be performed on the MCI (100). The actions may be associated with different types of predictions that may be generated by the predictor (120). The actions may, for example, include doing nothing if a prediction indicates that no threat was predicted, setting a flag to indicate that a threat is predicted, displaying a prediction and corresponding live data to a user through a user interface (e.g., a graphical user interface, a command-line interface, etc.), sending a warning message to a component (e.g., 102A, 102N) or a user to indicate that a threat is predicated, performing root-cause analysis to identify a component and/or user associated with the predicted threat, preventing access to a component (e.g., 102A, 102N) or by a component (e.g., 102A, 102N) associated with a threat, and/or updating a component associated with a threat. The diagnostic repository (148) may include additional, different, and/or fewer types of actions without departing from the embodiments disclosed herein.

While the data structures (e.g., 142, 144, 146, 148) and other data structures mentioned in this Detailed Description are illustrated/discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (140), any of the aforementioned data structures may be stored in different locations (e.g., in storage of other computing devices) and/or spanned across any number of computing devices without departing from embodiments disclosed herein. The data structures discussed in this Detailed Description may be implemented using, for example, file systems, lists, linked lists, tables, unstructured data, databases, etc.

In one or more embodiments, the network (160) may be implemented using may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the network (160) described herein and/or all, or a portion, of the methods illustrated in FIGS. 2.1-2.3. The network (160) may be implemented using other types of computing devices without departing from the embodiments disclosed herein. For additional details regarding computing devices, refer to FIG. 3.

The network (160) may be implemented using logical devices without departing from the embodiments disclosed herein. For example, the network (160) may include virtual machines that utilize computing resources of any number of physical computing devices to provide the functionality of the network (160). The network (160) may be implemented using other types of logical devices without departing from the embodiments disclosed herein.

In one or more embodiments, the network (160) may represent a (decentralized or distributed) computing network and/or fabric configured for computing resource and/or messages exchange among registered computing devices (e.g., the components (e.g., 102A, 102N) of the MCI (100) and the simulator (110)). As discussed above, components of the system may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (160) may be implemented using any combination of wired and/or wireless network topologies, and the network may be operably connected to the Internet or other networks. Further, the network (160) may enable interactions between, for example, the components (e.g., 102A, 102N) of the MCI (100), the simulator (110), and/or other entities not shown in FIG. 1.1 through any number and type of wired and/or wireless network protocols (e.g., TCP, UDP, IPv4, etc.).

The network (160) may encompass various interconnected, network-enabled subcomponents (not shown) (e.g., switches, routers, gateways, cables etc.) that may facilitate communications between the components of the system. In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (160) and its subcomponents may be implemented using hardware, software, or any combination thereof.

In one or more embodiments, before communicating data over the network (160), the data may first be broken into smaller batches (e.g., data packets) so that larger size data can be communicated efficiently. For this reason, the network-enabled subcomponents may break data into data packets. The network-enabled subcomponents may then route each data packet in the network (160) to distribute network traffic uniformly.

In one or more embodiments, the network-enabled subcomponents may decide how real-time (e.g., on the order of milliseconds or less) network traffic and non-real-time network traffic should be managed in the network (160). In one or more embodiments, the real-time network traffic may be high-priority (e.g., urgent, immediate, etc.) network traffic. For this reason, data packets of the real-time network traffic may need to be prioritized in the network (160). The real-time network traffic may include data packets related to, for example (but not limited to): videoconferencing, web browsing, voice over Internet Protocol (VoIP), etc.

As used herein, "communication" may refer to simple data passing, or may refer to two or more components coordinating a job. As used herein, the term "data" is intended to be broad in scope. In this manner, that term embraces, for example (but not limited to): data segments that are produced by data stream segmentation processes, data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

Although the system of FIG. 1.1 is shown as having a certain number of components (e.g., 100, 102A, 102N, 110, 120, 130, 140, 160), in other embodiments disclosed herein, the system may have more or fewer components. For example, the functionality of each component described above may be split across components or combined into a single component. Further still, each component may be utilized multiple times to carry out an iterative operation.

FIG. 1.2 shows a diagram of a training data repository in accordance with one or more embodiments disclosed herein. The training data repository (142) may be an embodiment of the training data repository (142, FIG. 1.1) discussed above. As discussed above, the training data repository (142) may include training data provided by components (e.g., 102A, 102N, FIG. 1.1) of the MCI (100, FIG. 1.1) and/or users and utilized by a predictor (120, FIG. 1.1). The training data may include baseline training data (150) and/or refinement training data (154). Each of these data structures is discussed below.

The baseline training data (150) may be a data structure that includes data provided by the components (e.g., 102A, 102N, FIG. 1.1) of the MCI (100) and/or users. The data may include the information regarding the components (e.g., 102A, 102N, FIG. 1.1) of the MCI (100, FIG. 1.1) and a truth label that specifies whether inputs included in the training data correspond to a threat classification or a non-threat classification. The baseline training data (150) may include any number of features associated with components (e.g., 102A, 102N, FIG. 1.1) of the MCI (100). The baseline training data (150) may be used by the predictor (120, FIG. 1.1) to generate an initial prediction model. The baseline training data (150) may include a training data set A (152). The baseline training data (150) may include other and/or additional training data sets and/or information without departing from embodiments disclosed herein.

As used herein, a feature may be an individual measurable property or characteristic of a phenomenon being observed. Features may be, for example, numeric representations of the observations of the phenomenon, identifiers associated with classifications of information, etc. Choosing certain features to include in machine learning model generation may lead to more effective models in identifying threats in risk simulation. For example, one feature may be more relevant to identifying threats than a second feature. Additionally, the features may be associated with weights (e.g., based on relevance) and thresholds that may be used by, or included in, the prediction models when performing risk simulations. The weights and thresholds may be configurable by the predictor and/or users. The weights and thresholds may be referred to as simulation parameters and may be updated when generating updated prediction models. Specific features included in the baseline training data (150) and/or the refinement training data (154) are discussed below. Training data set A (152) may include any combination of the features discussed below without departing from embodiments disclosed herein. Training data set A (152) may include other and/or additional features without departing from embodiments disclosed herein.

In one or more embodiments, the features may include network traffic patterns. In the MCI (100, FIG. 1.1), network traffic patterns provide insights into data exchanges between different cloud services hosted by components (e.g., 102A, 102N, FIG. 1.1) of the MCI (100) and the components (e.g., 102A, 102N, FIG. 1.1). Analyzing these patterns may indicate anomalies such as unusual spikes in traffic or unauthorized data transfers between cloud service providers, components, users, etc.

In one or more embodiments, the features may include user behavior. Understanding user behavior across multiple cloud platforms may be enable detection of unauthorized access or suspicious activities. User behavior may include login attempts, access patterns to different cloud resources, and changes in user behavior that may indicate a security breach (i.e., a threat).

In one or more embodiments, the features may include system activities associated with components (e.g., 102A, 102N, FIG. 1.1). Logs and data on system activities within the MCI (100, FIG. 1.1) may indicate the performance and health of cloud services within the MCI (100, FIG. 1.1). System activities may include tracking processes, file accesses, and configuration changes across different components (e.g., 102A, 102N, FIG. 1.1) to identify any abnormal behavior indicative of potential threats to the MCI (100, FIG. 1.1).

In one or more embodiments, the features may include geographical locations associated with components (e.g., 102A, 102N, FIG. 1.1) and users. Geographic data (e.g., longitude and latitude coordinates, city, state, region, country, street address, etc.) may be relevant in a multi-cloud environment for detecting unauthorized access of the MCI (100, FIG. 1.1) from unusual locations or regions. Analyzing geographical data may identify potential security breaches or compliance issues related to data residency requirements across different cloud regions or providers.

In one or more embodiments, the features may include time of access information associated with components (e.g., 102A, 102N, FIG. 1.1) and users. Timestamps (i.e., specifying second, minute, hour, day, month, year, etc.) may provide valuable information on the temporal patterns of activities within the MCI (100, FIG. 1.1). Analyzing the timing of access to cloud resources may indicate unusual access patterns or suspicious activities related to potential threats (e.g., access of components occurring outside of regular business hours).

In one or more embodiments, the features may include data transfer rates associated with components (e.g., 102A, 102N, FIG. 1.1) of the MCI (100, FIG. 1.1). Monitoring data transfer rates between different cloud services may enable the detection of anomalies such as unusually high or low data transfer volumes, which may indicate data exfiltration, denial of service attacks, or other potential security threats.

In one or more embodiments, the features may include Internet Protocol (IP) addresses. An IP address may refer to a numerical label such as "192.0.2.1" that is assigned to a device connected to a computer network that uses the Internet Protocol for communication. Tracking source and destination IP addresses of network traffic may be essential for identifying potential security risks such as unauthorized access attempts, suspicious connections, or malicious activities originating from specific IP addresses within a multi-cloud environment.

In one or more embodiments, the features may include device information associated with components (e.g., 102A, 102N, FIG. 1.1) of the MCI (100, FIG. 1.1) and computing devices attempting to access the components (e.g., 102A, 102N, FIG. 1.1). Analyzing device information, such as the type of devices accessing cloud resources and their configurations of components, may help in detecting unauthorized access attempts or compromised devices within a multi-cloud environment.

In one or more embodiments, the features may include user authentication logs. Monitoring user authentication logs across MCI components (e.g., 102A, 102N, FIG. 1.1) may enable the detection of unauthorized access attempts, brute force attacks, or suspicious login patterns that may indicate compromised user accounts or credentials indicative of potential threats.

In one or more embodiments, the features may include file integrity. Ensuring the integrity of critical system files and configurations across different MCI components (e.g., 102A, 102N, FIG. 1.1) may be essential for detecting unauthorized changes or tampering attempts that may compromise the security of the MCI (100, FIG. 1.1).

In one or more embodiments, the features may include system resource usage associated with components (e.g., 102A, 102N, FIG. 1.1) of the MCI (100, FIG. 1.1). The system resource usage may specify CPU, memory, and storage usage across the components (e.g., 102A, 102N, FIG. 1.1) of the MCI (100, FIG. 1.1) and may enable detection of abnormal resource consumption patterns that may indicate unauthorized activities, malware infections, or denial of service attacks.

In one or more embodiments, the features may include vulnerability information. The vulnerability information may specify known vulnerabilities (e.g., existing threats specified by users or cloud service providers) associated with the components (e.g., 102A, 102N, FIG. 1.1) of the MCI (100, FIG. 1.1). Vulnerability information may enable detection of common threats and may help in prioritizing security patches and updates to mitigate potential security risks across different components (e.g., 102A, 102N, FIG. 1.1).

In one or more embodiments, the features may include security event logs that may include information associated with security events. Monitoring security event logs may help in detecting and responding to security incidents, such as firewall alerts, intrusion attempts, or suspicious activities within the multi-cloud environment.

In one or more embodiments, the features may include malware signatures associated with existing malware infections. Analyzing known malware signatures and patterns may result in detecting and mitigating malware infections or malicious activities targeting cloud resources across different components (e.g., 102A, 102N, FIG. 1.1) of the MCI (100, FIG. 1.1).

In one or more embodiments, the features may include anomaly scores calculated using live data and historical data associated with the MCI (100, FIG. 1.1) and the components (e.g., 102A, 102N, FIG. 1.1). The anomaly scores may be generated by components (e.g., 102A, 102N, FIG. 1.1) or other entities associated with the components (e.g., 102A, 102N, FIG. 1.1) executing anomaly score generation algorithms. Any appropriate anomaly score generation algorithms may be used to generate anomaly scores without departing from embodiments disclosed herein. Calculating anomaly scores based on historical data may help in identifying deviations from normal behavior within the MCI (100, FIG. 1.1), indicating potential security threats or abnormal activities that may require further investigation.

In one or more embodiments, the features may include access control lists associated with the components (e.g., 102A, 102N, FIG. 1.1) of the MCI (100, FIG. 1.1). Managing access control lists may help in enforcing security policies and controlling user access to cloud resources based on predefined permissions and roles within the MCI (100, FIG. 1.1).

In one or more embodiments, the features may include intrusion detection alerts associated with the MCI (100, FIG. 1.1). Monitoring intrusion detection alerts may result in detecting and responding to potential security breaches or malicious activities targeting cloud resources across different cloud platforms of the MCI (100, FIG. 1.1).

In one or more embodiments, the features may include user permissions associated with the components (e.g., 102A, 102N, FIG. 1.1) of the MCI (100, FIG. 1.1). Managing user permissions and roles may ensure proper access control and enforce the principle of least privilege within the MCI (100, FIG. 1.1) to minimize the risk of unauthorized access or data breaches and to identify unauthorized access or data breaches.

In one or more embodiments, the features may include database access logs associated with the components (e.g., 102A, 102N, FIG. 1.1) of the MCI (100, FIG. 1.1). Monitoring database access logs helps in detecting unauthorized access attempts, SQL injection attacks, or other suspicious database activities within the MCI (100, FIG. 1.1).

In one or more embodiments, the features may include Domain Name System (DNS) request information. The DNS request information may include DNS requests and corresponding resolutions that may help in detecting and mitigating DNS-based attacks, such as DNS hijacking or DNS tunneling, targeting cloud resources across different cloud platforms.

Returning to the discussion of the training data repository (142), in one or more embodiments, the refinement training data (154) may include data provided by the components (e.g., 102A, 102N, FIG. 1.1) of the MCI (100) and/or users. The data may include the information regarding the components (e.g., 102A, 102N, FIG. 1.1) of the MCI (100, FIG. 1.1) and a truth label that specifies whether inputs included in the training data correspond to a threat classification or a non-threat classification. The refinement training data (154) may include any number of features associated with components (e.g., 102A, 102N, FIG. 1.1) of the MCI (100). The features may be associated with different threshold values and weight values compared to the baseline training data (150). The refinement training data (154) may include live data previously used to generate predictions during risk simulation using a previous prediction model with corresponding truth labels added by users. The refinement training data (154) may include additional training data not included in the baseline training data (150). The refinement training data (154) may include more data compared to the baseline training data (150). The refinement training data (154) may be used by the predictor (120, FIG. 1.1) to generate updated prediction models. The refinement training data (154) may include any quantity of training data sets such as training data set B (156B) and training data set N (156N). Each training data set (e.g., 156B) may be used to generate an updated prediction model. Training data set B (156B) and training data set N (156N) may each include any combination of the features discussed above without departing from embodiments disclosed herein. Training data set B (156B) and training data set N (156N) may each include other and/or additional features without departing from embodiments disclosed herein. The refinement training data (154) may include other and/or additional training data sets and/or information without departing from embodiments disclosed herein.

FIG. 2.1 shows a flowchart of a method for training an initial prediction model in accordance with one or more embodiments disclosed herein. The method shown in FIG. 2.1 may be performed by, for example, a simulator (e.g., 110, FIG. 1.1). Other components of the system in FIGS. 1.1-1.2 may perform all, or a portion, of the method of FIG. 2.1 without departing from the scope of the embodiments described herein. While FIG. 2.1 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 200, an initial prediction model training event associated with a multi-cloud infrastructure is identified. In one or more embodiments, the simulator may obtain a request from the MCI. In an alternative embodiment, the request may be obtained from a user (e.g., through a client not shown in FIG. 1.1, a user interface, etc.). The request may include a request to generate an initial prediction model to perform risk simulations for the MCI. The request may specify the MCI (e.g., communication information such as component identifiers, network addresses, etc.). The simulator may identify obtaining the request as the initial prediction model training event.

In embodiments where the request is obtained from the MCI, the request may be obtained from the MCI using any appropriate method of data transmission without departing from embodiments disclosed. For example, the request may be obtained as one or more network packets through network devices that operatively connect the simulator to the MCI. The initial prediction model training event associated with the MCI may be identified via other and/or additional methods without departing from embodiments disclosed herein.

In Step 202, training data associated with the MCI is obtained. In one or more embodiments, the training data manager of the simulator may request the user or the MCI (or components therein) to provide training data to the simulator. In response to obtaining the request, the user or the MCI may generate, collect, or otherwise obtain the training data and provide the training data to the training data manager. The training data may include baseline training data. The request and the training data may be transmitted using any appropriate method of data transmission without departing from embodiments disclosed herein. For example, the request and the training data may be transmitted as one or messages in one or more network packets through one or more network devices that operatively connect the MCI or user (e.g., client of the user) to the simulator. The training data associated with the MCI may be obtained via other and/or additional methods without departing from embodiments disclosed herein.

In Step 204, data preprocessing is performed on the training data to obtain processed training data. In one or more embodiments, the training data manager of the simulator may perform data preprocessing on the training data to obtain processed training data. The data processing may include any appropriate type of data preprocessing without departing from embodiments disclosed herein. For example, the training data manager may transform all, or a portion of, the training data from one data type to another so that the training data may be used by the machine learning algorithm to generate a prediction model, performing data cleaning, dimensionality reduction, data balancing, data sampling, etc. The data preprocessing may be performed on the training data to obtain processed training data via other and/or additional methods without departing from embodiments disclosed herein.

In Step 206, feature generation is performed using the processed training data to obtain featured training data. In one or more embodiments, the training data manager of the simulator may perform feature generation on the processed training data. Performing feature generation may include parsing the processed training data and extracting portions of the processed training data that are associated with features relevant to identifying threats during risk simulation. For example, the training data manager may parse the training data to extract network communication information to identify network traffic patterns included in the training data, access logs to identify user login attempts to extract user authentication information, etc. As such, the training data manager may generate featured training data that may include one or more training data sets that may be used as inputs to the machine learning algorithm to generate the prediction model. The feature generation may be performed using the processed training data to obtain featured training data via other and/or additional methods without departing from embodiments disclosed herein.

In Step 208, a prediction model is generated using the featured training data. In one or more embodiments, the predictor may introduce a first portion of the featured training data to a machine learning algorithm to generate the prediction model. The machine learning algorithm may be a KNN algorithm. The KNN algorithm may plot the inputs (i.e., the features) of each training data set in the first portion of the featured training data and identify two groups of inputs classified as threats and non-threats based on corresponding truth labels to generate the prediction model. As such, when new inputs are added to the prediction model, a distance (e.g., Euclidean distance, Manhattan distance, Hamming distance, etc.) may be calculated from the new inputs to each of the two groups to determine which group the inputs are closest to (i.e., calculate the distances between the inputs and the two groups). The prediction model may classify the inputs based on the group that the input is closest to as specified by the calculated distances. The prediction model may be generated using the featured training data via other and/or additional methods without departing from embodiments disclosed herein.

In Step 210, model validation is performed using the prediction model. In one or more embodiments, the predictor of the simulator may perform model validation using the prediction model. The predictor may generate the prediction model using a first portion of the featured training data to generate the prediction model as discussed in Step 208. The predictor may then perform model validation using the second portion of the featured training data. The predictor may generate predictions using the second portion of the featured training data and the prediction model. The predictor may compare the generated predictions with the truth labels in the second portion of the featured training data and calculate an error associated with the prediction model. The error may specify a percentage of the generated predictions that match the corresponding truth labels. In other words, the error may specify the accuracy of the prediction model.

Additionally, the predictor may also generate a confusion matrix based on the comparison of generated predictions and the truth labels. The confusion matrix may include a first row specifying all of the training data set used as a single set of inputs to generate a single prediction, a second row showing the actual prediction classifications (e.g., threat or non-threat), a third row including the predicted classifications (e.g., threat or non-threat) generated by the prediction model. The confusion matrix may include a fourth row specifying whether the generated prediction was a true positive (e.g., prediction and truth label indicate a threat classification), a true negative (e.g., prediction and truth label indicate a non-threat classification), a false negative (e.g., a prediction indicates a non-threat and the truth label indicates a threat) and a false positive (e.g., prediction indicates a threat and the truth label indicates a non-threat). The predictor may generate a percentage of the predictions that were true positives, true negatives, false positives, and false negatives using the confusion matrix.

In one or more embodiments, the predictor may compare the error to an error to a user configurable error threshold and the true positive percentage, true negative percentage, false positive percentage, and false negative percentage to corresponding user configurable thresholds associated with each percentage to verify that the prediction model is performing adequately prior to performing risk simulation on live data using the prediction model. If one or any combination of the error or any of the true positive percentage, true negative percentage, false positive percentage, and false negative percentage is below a corresponding threshold, the predictor may notify a user and/or request additional training data and repeat Steps 202-210 to generate and verify an updated model with adequate performance. Additionally, the predictor may also update risk simulation parameters to improve prediction model performance (see Step 248, FIG. 2.3). Model validation may be performed using the prediction model via other and/or additional methods without departing from embodiments disclosed herein.

In Step 212, threat simulation is performed using the prediction model. In one or more embodiments, the simulator may perform threat simulation via the methods described in FIG. 2.2. For additional information regarding performing threat simulation using the prediction model, refer to FIG. 2.2.

In one or more embodiments disclosed herein, the method ends following Step 212.

FIG. 2.2 shows a flowchart of a method for performing risk simulation in accordance with one or more embodiments disclosed herein. FIG. 2.2 shows a flowchart of a method for training an initial prediction model in accordance with one or more embodiments disclosed herein. The method shown in FIG. 2.2 may be performed by, for example, a simulator (e.g., 110, FIG. 1.1). Other components of the system in FIGS. 1.1-1.2 may perform all, or a portion, of the method of FIG. 2.2 without departing from the scope of the embodiments described herein. While FIG. 2.2 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 220, the MCI is prepared for live data collection. In one or more embodiments, the predictor may send a request to the MCI to perform monitoring to generate live data and to provide the live data to the simulator in real time or periodically. In one or more embodiments, the live data may include the same types of data as the training data and the refinement training data, except for the truth labels. In response to obtaining the request, the MCI may begin executing monitoring services, initiate executing of monitoring services by external entities, collecting live data from components. The request may be sent to the MCI using any appropriate method of data transmission without departing from embodiments disclosed herein. For example, the request may be sent as a message that includes one or more network packets through one or more network devices that operatively connect the simulator to the MCI. The MCI may be prepared for live data collection via other and/or additional methods without departing from embodiments disclosed herein.

In Step 222, live data is obtained from the MCI. As discussed above, the MCI may provide live data to the simulator in real time or periodically to perform risk simulations using the live data. Accordingly, the MCI may generate, collect, or otherwise obtain the live data and provide the live data to the training data manager. The request and the live data may be transmitted using any appropriate method of data transmission without departing from embodiments disclosed herein. For example, the live data may be transmitted as one or messages in one or more network packets through one or more network devices that operatively connect the MCI to the simulator. The live data may be obtained from the MCI via other and/or additional methods without departing from embodiments disclosed herein.

In Step 224, a prediction is generated using the live data and the prediction model. In one or more embodiments, the predictor may use the live data and the prediction model to generate a prediction associated with risk simulation. The live data may include data regarding the MCI and components of the MCI. The live data may include the same features as the training data. After obtaining the prediction model and the live data, the predictor may introduce the live data into the prediction model. In other words, the prediction model may use the live data as inputs and produce a prediction. The prediction may be that the live data is associated with a threat or that the live data is not associated with a threat. The prediction may be generated using the live data and the prediction model via other and/or additional methods without departing from embodiments disclosed herein.

In Step 226, a determination is made as to whether the prediction is associated with an identified threat. As discussed above, the prediction generated by the prediction model may include a classification that specifies either that the set of inputs included in the live data is associated with a threat in the MCI or that the set of inputs included in the live data is not associated with a threat. In one or more embodiments disclosed herein, if the prediction is classified as a threat, then the predictor of the simulator may determine that the prediction is associated with an identified threat. In one or more embodiments disclosed herein, if the prediction is not classified as a threat, then the predictor of the simulator may determine that the prediction is not associated with an identified threat. The determination as to whether the prediction is associated with an identified threat may be made via other and/or additional methods without departing from embodiments disclosed herein.

In one or more embodiments disclosed herein, if it is determined that the prediction is associated with an identified threat, then the method proceeds to Step 228. In one or more embodiments disclosed herein, if it is determined that the prediction is not associated with an identified threat, then the method proceeds to Step 230.

In Step 228, threat remediation is performed using the prediction and a diagnostic repository. As discussed above, the simulator may include a diagnostic repository that may include one or more data structures that include actions that the simulator may perform or may initiate to be performed on the MCI based on the prediction. The predictor may compare the prediction and the live data with the predictions and actions included in the diagnostic repository and preform or initiate performance of the actions specified by the diagnostic repository. For example, predictor may do nothing if a prediction indicates that no threat was predicted, set a flag to indicate that a threat is predicted, display a prediction and corresponding live data to a user through a user interface (e.g., a graphical user interface, a command-line interface, etc.), send a warning message to a component of the MCI or a user to indicate that a threat is predicated, perform root-cause analysis using live data to identify a component and/or user associated with the predicted threat, prevent access to a component of the MCI or by a component of the MCI associated with a threat, and/or update a component associated with a threat. Threat remediation may be performed using the prediction and a diagnostic repository via other and/or additional methods without departing from embodiments disclosed herein.

In Step 230, a determination is made as to whether a model update event has been identified. In one or more embodiments, the predictor of the simulator may determine whether a model update event has been identified.

In one or more embodiments, the predictor may include or otherwise have access to a prediction model update schedule. The prediction model update schedule may be a data structure generated and configurable by a user that specifies points in time to generate updated prediction models. In one or more embodiments, if it is determined that a point in time specified by the predicit0n model update event has occurred, then the predictor may determine that a model update event has been identified. In one or more embodiments, if it is determined that a point in time specified by the predicit0n model update event has not occurred, then the predictor may determine that a model update event has not been identified.

In one or more embodiments, the predictor may obtain a request to perform a prediction model update from a user. In one or more embodiments, the request may be obtained directly from a user (e.g., through a user interface such as a graphical user interface, a command-line interface, etc.) or from a computing device used by a user. In embodiments where the request is obtained from a computing device used by a user, the request may be transmitted using any appropriate method of data transmission without departing from embodiments disclosed herein. For example, the request may be sent as a message including one or more network packets through one or more network devices that operatively connect the simulator to the computing device used by the user. In one or more embodiments disclosed herein, if the simulator obtains a request to perform a prediction model update, then the predictor may determine that a model update event has been identified. In one or more embodiments disclosed herein, if the simulator does not obtain a request to perform a prediction model update, then the predictor may determine that a model update event has not been identified.

In one or more embodiments, the predictor may obtain from users truth labels associated with predictions that specify whether a threat was identified or not for the corresponding live data to confirm whether the predictions were accurate. The predictor may then use the truth labels to calculate the error associated with the prediction model. In one or more embodiments disclosed herein, if the error drops below a user configurable error threshold after a configurable number of predictions are generated or a configurable period of time has passed since the generation of the current prediction model, then the predictor may determine that a model update event has been identified. In one or more embodiments disclosed herein, if the error does not drop below a user configurable error threshold after a configurable number of predictions are generated or a configurable period of time has passed since the generation of the current prediction model, then the predictor may determine that a model update event has not been identified.

The determination as to whether a prediction model update event has been identified may be made via other and/or additional methods without departing from embodiments disclosed herein.

In one or more embodiments disclosed herein, if it is determined that a model update event is identified, then the method proceeds to Step 232. In one or more embodiments disclosed herein, if it is determined that a model update event is not identified, then the method proceeds to Step 234.

In Step 232, an updated prediction model is generated. The updated prediction model may be generated via the methods discussed in FIG. 2.3. For additional information regarding generating an updated prediction model, refer to FIG. 2.3.

In one or more embodiments disclosed herein, the method ends following Step 232.

In Step 234, a determination is made as to whether to stop the simulation. In one or more embodiments, the predictor may obtain a request to stop risk simulation from a user. In one or more embodiments, the request may be obtained directly from a user (e.g., through a user interface such as a graphical user interface, a command-line interface, etc.) or from a computing device used by a user. In embodiments where the request is obtained from a computing device used by a user, the request may be transmitted using any appropriate method of data transmission without departing from embodiments disclosed herein. For example, the request may be sent as a message including one or more network packets through one or more network devices that operatively connect the simulator to the computing device used by the user. In one or more embodiments disclosed herein, if the simulator obtains a request to stop risk simulation, then the predictor may determine to stop risk simulation. In one or more embodiments disclosed herein, if the simulator does not obtain a request to stop risk simulation, then the predictor may determine to not stop risk simulation.

In one or more embodiments disclosed herein, if it is determined that the simulation is to be stopped, then the method ends following Step 234. In one or more embodiments disclosed herein, if it is determined that the simulation is not to be stopped, then the method to Step 222 following Step 234.

FIG. 2.3 shows a flowchart of a method for updating a predication model in accordance with one or more embodiments disclosed herein. FIG. 2.3 shows a flowchart of a method for training an initial prediction model in accordance with one or more embodiments disclosed herein. The method shown in FIG. 2.3 may be performed by, for example, a simulator (e.g., 110, FIG. 1.1). Other components of the system in FIGS. 1.1-1.2 may perform all, or a portion, of the method of FIG. 2.3 without departing from the scope of the embodiments described herein. While FIG. 2.3 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 240, refinement training data is obtained. In one or more embodiments, the training data manager of the simulator may request the user or the MCI (or components therein) to provide refinement training data to the simulator. In response to obtaining the request, the user or the MCI may generate, collect, or otherwise obtain the refinement training data and provide the refinement training data to the training data manager. The request and the refinement training data may be transmitted using any appropriate method of data transmission without departing from embodiments disclosed herein. For example, the request and the refinement training data may be transmitted as one or messages in one or more network packets through one or more network devices that operatively connect the MCI or user (e.g., client of the user) to the simulator. The refinement training data associated with the MCI may be obtained via other and/or additional methods without departing from embodiments disclosed herein.

In Step 242, data preprocessing is performed on the refinement training data to generate processed refinement training data. In one or more embodiments, the training data manager of the simulator may perform data preprocessing on the refinement training data to obtain processed training data. The data processing may include any appropriate type of data preprocessing without departing from embodiments disclosed herein. For example, the training data manager may transform all, or a portion of, the refinement training data from one data type to another so that the refinement training data may be used by the machine learning algorithm to generate a prediction model, perform data cleaning, dimensionality reduction, data balancing, data sampling, etc. The data preprocessing may be performed on the refinement training data to obtain processed refinement training data via other and/or additional methods without departing from embodiments disclosed herein.

In Step 244, feature generation is performed on the processed refinement training data to obtained featured refinement training data. In one or more embodiments, the training data manager of the simulator may perform feature generation on the processed refinement training data. Performing feature generation may include parsing the processed refinement training data and extracting portions of the processed refinement training data that are associated with features relevant to identifying threats during risk simulation. For example, the training data manager may parse the refinement training data to extract network communication information to identify network traffic patterns included in the training data, access logs to identify user login attempts to extract user authentication information, etc. As such, the training data manager may generate featured refinement training data that may include one or more training data sets that may be used as inputs to the machine learning algorithm to generate the prediction model. The feature generation may be performed using the processed refinement training data to obtain featured refinement training data via other and/or additional methods without departing from embodiments disclosed herein.

In Step 246, an updated prediction model is generated using the featured refinement training data. In one or more embodiments, the predictor may introduce a first portion of the featured refinement training data to a machine learning algorithm to generate the updated prediction model. The machine learning algorithm may be a KNN algorithm. The KNN algorithm may plot the inputs (i.e., the features) of each training data set in the first portion of the featured refinement training data and identify two groups of inputs classified as threats and non-threats based on corresponding truth labels to generate the prediction model. As such, when new inputs are added to the prediction model, a distance (e.g., Euclidean distance, Manhattan distance, Hamming distance, etc.) may be calculated from the new inputs to each of the two groups to determine which group the inputs are closest to (i.e., calculate the distances between the inputs and the two groups). The prediction model may classify the inputs based on the group that the input is closest to as specified by the calculated distances. The prediction model may be generated using the featured refinement training data via other and/or additional methods without departing from embodiments disclosed herein.

In Step 248, simulation parameters are updated. As discussed above, the features may be associated with weights (e.g., based on relevance) and thresholds that may be used by, or included in, the prediction models when performing risk simulations. The weights and thresholds may be configurable by the predictor and/or users. The weights and thresholds may be referred to as simulation parameters. The predictor may update the values of the weights and thresholds associated with each feature used as inputs in the prediction model. The predictor may update the values of the weights of features based on previous prediction model performance (i.e., identify relevant features and increase weight associated with highly relevant features and lower weight associated with non-relevant features) and/or user instructions (i.e., a user may specify weights associates with any of the features). The predictor may also update the threshold values associated with one or more features to increase or decrease the sensitivity of the feature on the prediction model based on previous prediction model performance (i.e., identify features associated with false negatives and raise the threshold, identify features associated with false positives and lower the threshold, etc.) and/or user instructions (i.e., a user may specify thresholds associates with any of the features). The simulation parameters may be updated via other and/or additional methods without departing from embodiments disclosed herein.

In Step 250, model validation is performed using the updated prediction model. In one or more embodiments, the predictor of the simulator may perform model validation using the prediction model. The predictor may generate the prediction model using a first portion of the featured refinement training data to generate the prediction model as discussed in Step 208. The predictor may then perform model validation using the second portion of the featured refinement training data. The predictor may generate pre-dictions using the second portion of the featured refinement training data and the prediction model. The predictor may compare the generated predictions with the truth labels in the second portion of the featured refinement training data and calculate an error associated with the prediction model. The error may specify a percentage of the generated predictions that match the corresponding truth labels. In other words, the error may specify the accuracy of the prediction model.

Additionally, the predictor may also generate a confusion matrix based on the comparison of generated predictions and the truth labels. The confusion matrix may include a first row specifying all of the training data set used as a single set of inputs to generate a single prediction, a second row showing the actual prediction classifications (e.g., threat or non-threat), a third row including the predicted classifications (e.g., threat or non-threat) generated by the prediction model. The confusion matrix may include a fourth row specifying whether the generated prediction was a true positive (e.g., prediction and truth label indicate a threat classification), a true negative (e.g., prediction and truth label indicate a non-threat classification), a false negative (e.g., a prediction indicates a non-threat and the truth label indicates a threat) and a false positive (e.g., prediction indicates a threat and the truth label indicates a non-threat). The predictor may generate a percentage of the predictions that were true positives, true negatives, false positives, and false negatives using the confusion matrix.

In one or more embodiments, the predictor may compare the error to an error to a user configurable error threshold and the true positive percentage, true negative percentage, false positive percentage, and false negative percentage to corresponding user configurable thresholds associated with each percentage to verify that the prediction model is performing adequately prior to performing risk simulation on live data using the prediction model. If one or any combination of the error or any of the true positive percentage, true negative percentage, false positive percentage, and false negative percentage is below a corresponding threshold, the predictor may notify a user and/or request additional refinement training data and repeat Steps 240-250 to generate and verify an updated model with adequate performance. Model validation may be performed using the prediction model via other and/or additional methods without departing from embodiments disclosed herein.

In Step 252, threat simulation is performed using the updated prediction model. In one or more embodiments, the simulator may perform threat simulation via the methods described in FIG. 2.2. For additional information regarding performing threat simulation using the prediction model, refer to FIG. 2.2.

In one or more embodiments disclosed herein, the method ends following Step 252.

As discussed above, embodiments of the invention may be implemented using computing devices. FIG. 3 shows a diagram of a computing device in accordance with one or more embodiments of the invention. The computing device (300) may include one or more computer processors (302), non-persistent storage (304) (e.g., volatile storage, such as random access memory (RAM), cache memory), persistent storage (306) (e.g., non-volatile storage such as a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

As used herein, an entity that is programmed to, or configured to, perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for performing threat simulations, comprising:

preparing a multi-cloud infrastructure (MCI) for live data collection, wherein:

the MCI comprises a plurality of components, a first component of the plurality of components is associated with a first cloud service provider, and a second component of the plurality of components is associated with a second cloud service provider;

obtaining, after the preparing, live data from the MCI;

generating a prediction using the live data and a prediction model, wherein the prediction specifies whether the live data indicates that there is a threat within the MCI;

making a first determination that the prediction indicates a threat associated with the MCI has been identified;

in response to the first determination:

performing threat remediation using the prediction and a diagnostic repository;

after performing threat remediation:

making a second determination that a model update event is identified;

in response to the second determination:

obtaining refinement training data;

performing data processing on the refinement training data to obtain processed refinement training data;

performing, after performing data processing, feature generation on the processed refinement training data to obtain featured refinement training data;

generating an updated prediction model using the featured refinement training data;

updating simulation parameters of the updated prediction model based on a prior prediction model performance, wherein the simulation parameters comprise weights and thresholds;

performing model validation using the updated prediction model, comprising:

generating a confusion matrix using the prediction model and validation training data, calculating an error associated with the prediction model, and comparing the error, a true positive percentage, a true negative percentage, a false positive percentage, and a false negative percentage to corresponding user configurable thresholds; and initiating threat simulation using the updated prediction model.

2. The method of claim 1, wherein the live data comprises a first portion associated with the first component and a second portion associated with the second component.

3. The method of claim 2, wherein the first portion comprises:

network traffic information associated with the first component;

a geographic location of the first component;

system activities associated with the first component;

user behavior associated with the first component;

user authentication logs associated with the first component; and data transfer rates associated with the first component.

4. The method of claim 1, wherein the diagnostic repository specifies at least one action to perform to remediate the threat associated with the prediction.

5. The method of claim 1, wherein the prediction model comprises a K-Nearest Neighbors prediction model.

6. The method of claim 1, further comprising:

prior to preparing the MCI for live data collection:

identifying an initial prediction model training event associated with the MCI;

obtaining, in response to the identifying, training data associated with the MCI;

performing data preprocessing on the training data to obtain processed training data;

performing feature generation using the processed training data to obtain featured training data;

generating the prediction model using the featured training data;

performing model validation using the prediction model; and initiating threat simulation using the prediction model.

7. The method of claim 1, wherein the refinement training data comprises additional data compared to the training data.

8. The method of claim 7, wherein the refinement training data comprises labeled live data generated by a user.

9. A non-transitory computer readable medium comprising computer readable program code, which when executed by a computer processor enables the computer processor to perform a method for performing threat simulations, the method comprising:

preparing a multi-cloud infrastructure (MCI) for live data collection, wherein:

the MCI comprises a plurality of components, a first component of the plurality of components is associated with a first cloud service provider, and a second component of the plurality of components is associated with a second cloud service provider;

obtaining, after the preparing, live data from the MCI;

generating a prediction using the live data and a prediction model, wherein the prediction specifies whether the live data indicates that there is a threat within the MCI;

making a first determination that the prediction indicates a threat associated with the MCI has been identified;

in response to the first determination:

performing threat remediation using the prediction and a diagnostic repository;

after performing threat remediation:

making a second determination that a model update event is identified;

in response to the second determination:

obtaining refinement training data;

performing data processing on the refinement training data to obtain processed refinement training data;

performing, after performing data processing, feature generation on the processed refinement training data to obtain featured refinement training data;

generating an updated prediction model using the featured refinement training data;

updating simulation parameters of the updated prediction model based on a prior prediction model performance, wherein the simulation parameters comprise weights and thresholds;

performing model validation using the updated prediction model, comprising:

generating a confusion matrix using the prediction model and validation training data, calculating an error associated with the prediction model, and comparing the error, a true positive percentage, a true negative percentage, a false positive percentage, and a false negative percentage to corresponding user configurable thresholds; and initiating threat simulation using the updated prediction model.

10. The non-transitory computer readable medium of claim 9, wherein the live data comprises a first portion associated with the first component and a second portion associated with the second component.

11. The non-transitory computer readable medium of claim 10, wherein the first portion comprises:

network traffic information associated with the first component;

a geographic location of the first component;

system activities associated with the first component;

user behavior associated with the first component;

user authentication logs associated with the first component; and data transfer rates associated with the first component.

12. The non-transitory computer readable medium of claim 9, wherein the diagnostic repository specifies at least one action to perform to remediate the threat associated with the prediction.

13. The non-transitory computer readable medium of claim 9, wherein the prediction model comprises a K-Nearest Neighbors prediction model.

14. The non-transitory computer readable medium of claim 9, wherein the method further comprising:

prior to preparing the MCI for live data collection:

identifying an initial prediction model training event associated with the MCI;

obtaining, in response to the identifying, training data associated with the MCI;

performing data preprocessing on the training data to obtain processed training data;

performing feature generation using the processed training data to obtain featured training data;

generating the prediction model using the featured training data;

performing model validation using the prediction model; and initiating threat simulation using the prediction model.

15. The non-transitory computer readable medium of claim 9, wherein the refinement training data comprises additional data compared to the training data.

16. The non-transitory computer readable medium of claim 15, wherein the refinement training data comprises labeled live data generated by a user.

* * * * *